United States Patent
Mohammadkhani et al.

(10) Patent No.: US 12,435,214 B2
(45) Date of Patent: Oct. 7, 2025

(54) METHODS FOR PRODUCING HIGHLY THERMOFORMABLE ACRYLIC SOLID SURFACE

(71) Applicant: Trinseo Europe GmbH, Pfaeffikon (CH)

(72) Inventors: Mohammad Mohammadkhani, Florence, KY (US); Roger Neil Caldwell, Erlanger, KY (US); Mark Gatman, Erlanger, KY (US); Sebastian Joseph, Mason, OH (US)

(73) Assignee: Trinseo Europe GmbH, Pfaeffikon (CH)

( * ) Notice: Subject to any disclaimer, the term of this patent is extended or adjusted under 35 U.S.C. 154(b) by 250 days.

(21) Appl. No.: 18/269,987

(22) PCT Filed: Dec. 28, 2021

(86) PCT No.: PCT/US2021/065309
§ 371 (c)(1),
(2) Date: Jun. 28, 2023

(87) PCT Pub. No.: WO2022/146984
PCT Pub. Date: Jul. 7, 2022

(65) Prior Publication Data
US 2024/0084124 A1    Mar. 14, 2024

Related U.S. Application Data

(60) Provisional application No. 63/131,990, filed on Dec. 30, 2020.

(51) Int. Cl.
| | |
|---|---|
| C08L 33/04 | (2006.01) |
| B29C 51/00 | (2006.01) |
| C08K 3/22 | (2006.01) |
| C08K 3/36 | (2006.01) |
| B29K 33/04 | (2006.01) |
| B29K 105/16 | (2006.01) |
| B29K 105/24 | (2006.01) |
| B29K 509/00 | (2006.01) |

(52) U.S. Cl.
CPC ............ *C08L 33/04* (2013.01); *B29C 51/002* (2013.01); *C08K 3/22* (2013.01); *C08K 3/36* (2013.01); *B29K 2033/04* (2013.01); *B29K 2105/16* (2013.01); *B29K 2105/24* (2013.01); *B29K 2509/00* (2013.01); *B29K 2995/0024* (2013.01); *B29K 2995/0063* (2013.01); *C08K 2003/2227* (2013.01); *C08K 2201/005* (2013.01); *C08K 2201/006* (2013.01); *C08K 2201/014* (2013.01); *C08L 2203/30* (2013.01); *C08L 2205/025* (2013.01); *C08L 2312/00* (2013.01)

(58) Field of Classification Search
CPC .............. B29C 51/002; B29K 2033/04; B29K 2033/08; B29K 2105/16; B29K 2105/24; B29K 2509/00; B29K 2995/0024; B29K 2995/0063; B32B 5/18; C08F 20/14; C08F 220/14; C08F 265/06; C08K 2003/2227; C08K 2201/005; C08K 2201/006; C08K 2201/014; C08K 3/22; C08K 3/36; C08L 2203/30; C08L 2205/025; C08L 2312/00; C08L 33/04; C08L 33/06; F02B 75/22
See application file for complete search history.

(56) References Cited

U.S. PATENT DOCUMENTS

| | | |
|---|---|---|
| 5,567,745 A | 10/1996 | Minghetti et al. |
| 5,985,972 A | 11/1999 | Minghetti |
| 2015/0035207 A1 | 2/2015 | Gatman et al. |
| 2018/0163042 A1 | 6/2018 | Gatman et al. |
| 2021/0102057 A1 | 4/2021 | Mohammadkhani et al. |

FOREIGN PATENT DOCUMENTS

| | | |
|---|---|---|
| JP | 2000-212370 A | 8/2000 |
| WO | 9817713 A1 | 4/1998 |

OTHER PUBLICATIONS

International Preliminary Report on Patentability and Written Opinion for International Application No. PCT/US2021/065309, issued Jul. 4, 2023, 7 pages.

Extended European Search Report issued Nov. 11, 2024, by the European Patent Office in corresponding European Patent Application No. 21916349.0-1102. (7 pages).

International Search Report and Written Opinion for International Application No. PCT/US2021/065309, dated Mar. 15, 2022, 8 pages.

*Primary Examiner* — Lawrence D Ferguson
(74) *Attorney, Agent, or Firm* — Buchanan Ingersoll & Rooney PC

(57) ABSTRACT

Articles may be formed from a thermoformable composition, the thermoformable composition including: a) about 35 wt % to about 95 wt % of an acrylic pre-polymerized syrup; b) about 0 wt % to about 10 wt % of a comonomer; and c) about 5 wt % to about 65 wt % of a filler having an average particle size (d50) in a range of about 0.1 μm to about 50 μm; wherein the article has a surface having a gloss measurement at a 60° measurement angle within a range of about 0 Gloss Units to about 20 Gloss Units, and a roughness Ra within a range of about 1 microinch to about 100 microinches. Methods may include producing a thermoformed article by the steps of: i) preparing a thermoformable composition; ii) casting the thermoformable composition into a sheet; and iii) thermoforming the cast sheet against a mold to produce a thermoformed article.

18 Claims, No Drawings

METHODS FOR PRODUCING HIGHLY THERMOFORMABLE ACRYLIC SOLID SURFACE

CROSS-REFERENCES TO RELATED APPLICATIONS

This is the U.S. National Phase Application of International Application No. PCT/US2021/065309, filed Dec. 28, 2021, which claims priority to U.S. Provisional Application No. 63/131,990, filed Dec. 30, 2020, the entire contents of each of which are incorporated herein by reference for all purposes.

FIELD OF THE INVENTION

The invention relates to thermoformable compositions, articles formed from the composition and methods of forming the articles.

BACKGROUND

Thermoformable acrylics or other plastic materials are utilized in the marketplace to produce textured and non-slip surfaces for use in wet areas, such as pools, kitchens, and baths. Textured surfaces are produced in some instances by producing a rough plastic surface, followed by the addition of particulates or other materials to impart a roughened surface to the liquid or molten acrylic. However, for the formation of thinner surfaces and complex shapes, subsequent processing of the rough plastic surface by stretching or thermoforming results in a reduction or elimination of the features of the textured surface. The addition of some particulates also changes the stiffness and/or appearance of the surface and can render the material more prone to defects during shaping and bending and more difficult to repair.

SUMMARY OF THE DISCLOSURE

In an aspect, embodiments of the present disclosure are directed to articles formed from a thermoformable composition, the thermoformable composition including: a) about 35 wt % to about 95 wt % of an acrylic pre-polymerized syrup; b) about 0 wt % to about 10 wt % of a comonomer; and c) about 5 wt % to about 65 wt % of a filler having an average particle size (d50) in a range of about 0.1 µm to about 50 µm; wherein the article has a surface having a gloss measurement at a 60° measurement angle within a range of about 0 Gloss Units to about 20 Gloss Units, and a roughness Ra within a range of about 1 microinch to about 100 microinches.

In another aspect, methods are directed to producing a thermoformed article by the steps of: i.) preparing a thermoformable composition comprising: a) about 35 wt % to about 95 wt % of an acrylic pre-polymerized syrup; b) about 0 wt % to about 10 wt % of a comonomer; and c) about 5 to about 65 wt % of a filler having an average particle size (d50) in a range of 0.1 µm to 50 µm; ii.) casting the thermoformable composition into a sheet; and iii.) thermoforming the cast sheet against a mold to produce a thermoformed article, wherein the article has a surface having a gloss measurement at a 60° measurement angle within a range of about 0 Gloss Units to about 20 Gloss Units, and a roughness Ra within a range of about 1 microinch to about 100 microinches.

DETAILED DESCRIPTION

The present disclosure relates to thermoformable compositions for producing textured, roughened, or "non-slip" polymeric surfaces. Thermoformable compositions disclosed herein include compositions having increased thermoformability through control over the average particle size and the ratio of filler content to polymer matrix, which can produce solid surfaces that bend to small radius angles not possible with conventional acrylic formulations. Furthermore, these thermoformable compositions may be easily repaired when scratched or stained, develop a matte appearance when stretched or thermoformed, and have a pleasing tactile perception. In another aspect, thermoformability of polymeric surfaces is also enhanced by adjusting the molecular structure of the material by controlling the density of the intra- and inter-molecular crosslinks between the polymer matrix and/or filler particles.

Comparative thermoforming methods of preparing polymeric surfaces having a matte appearance and textured finish often employ mechanical methods of surface roughening, such as during a casting or extrusion process on a liquid or molten acrylic to produce a textured sheet, or by sanding or abrasion. Mechanical methods are often limited in end-use applications, however, as downstream processing of the polymeric surfaces by stretching or heating to form more complex shapes can alter or degrade the surface texture. Chemical methods in which the polymer formulation components are modified can also be used to prepare rigid polymeric surfaces that withstand working and sanding. For example, acrylic solid surfaces are formulated with high concentrations of metal oxides that provide rigid surfaces, but the increased surface rigidity limits thermoformability and places limitations on draft angles, such that lower angles are prone to cracking and stress whitening at the bending position.

Thermoformable compositions disclosed herein include polymer-forming compositions that contain one or more fillers having reduced particle size and concentration. The reduced concentration of filler increases the thermoformability of the solid surface, while maintaining the strength to withstand mechanical processing techniques, such as by sanding (e.g., with 320 grit sandpaper) or producing it over a matte film. The thermoforming properties of the disclosed compositions is enhanced with respect to compositions having higher filler, resulting in a composition that can be folded on itself during thermoforming, without loss of texture, crack formation, or stress-whitening, regardless of the color of the solid surface material. Thermoformable compositions disclosed can be used to produce distinct, roughened, and "non-slip" surfaces for residential and commercial applications, including sheets and articles that range in thickness from 1.5 mm to 10 mm or greater.

Thermoformable compositions disclosed herein include a base of acrylic pre-polymerized syrup that can also include one or more comonomers or copolymers. The acrylic pre-polymerized syrup can be included at a percent by weight (wt %) of about 35-95 wt % of the thermoformable composition. In some embodiments, the acrylic pre-polymerized syrup can include a percent by weight of solids (wt %) of 5-40 wt %. The acrylic pre-polymerized syrup can include polymers and oligomers having a weight average molecular weight in a range between 10k-450k g/mol. Thermoformable compositions can include a base of acrylate monomer in some cases, such as when the filler particle size is small (e.g., <2.0 µm) and/or for high filler content compositions (e.g., >20 wt %). For example, a thermoformable composition utilizing an acrylate monomer base can include a filler having a particle size of about 0.9 µm and at a percent by weight of about 50 wt %.

Thermoformable compositions can include one or more comonomers, copolymers, or additional pre-polymers at a percent by weight (wt %) in a range of about 0-10 wt %. Suitable comonomers (and polymers and pre-polymers formed therefrom) can include additional acrylate and methacrylate monomers, such as methyl acrylate, butyl acrylate, benzyl acrylate, methyl methacrylate, and derivatives thereof. For thermoformable compositions incorporating copolymers or additional pre-polymers, the copolymers or additional pre-polymers can have a weight average molecular weight in a range between 10k-450k g/mol.

Thermoformable compositions can exhibit enhanced thermoformability and surface texture by controlling at least two variables, individually or simultaneously: the properties of an added filler; and controlling the molecular structure of the polymer matrix. Each method will be described in greater detail below.

In some embodiments, surface texture and thermoformability can be controlled through the inclusion of a filler having a defined average particle size that is combined at ratios that balance the persistence of surface features following processing with thermoformability. Thermoformable compositions can include one or more fillers added at a percent by weight in a range of 5 wt % to 65 wt %. In some embodiments, the ratio of filler to acrylic pre-polymerized syrup is within a range of 0.05 to 1.9. Suitable fillers can include metal oxides such as alumina trihydrate (ATH), aluminum monohydrate, magnesium hydroxide, magnesium silicate, talc, silicas such as fumed silica and precipitated silica, calcium carbonate, calcium metasilicate, Wollastonite, Dolomite, Perlite, hollow glass spheres, kaolin, and the like.

Particle size of the filler can be used to control both surface texture and appearance in some embodiments. Larger particle sizes are often associated with increased surface roughness and rigidity, while smaller particle sizes can be associated with reduced glossiness and increased matte appearance. Thermoformable compositions disclosed herein can include fillers having a mean particle size (d50) as determined by laser diffraction particle sizing analyzer in the range of 0.1 μm to 50 μm, 1 μm to 25 μm, or 2 μm to 17 μm. While particle size calculations may assume an equivalent sphere, filler particles shape is not limited and may include shapes such as spherical, semi-spherical, ovoid, polyhedric, fibrous, cylindrical, and the like. As the d50 of the particles decreases, the hygroscopic nature and potential moisture content of the filler increases. Increased moisture content in the filler can lead to increased moisture content in the final product (e.g., sheet or article) that leads to downstream defects, such as blistering. To reduce defects, thermoformable compositions can include fillers that are procured having, or are dried to include, a moisture content of less than 1 wt %, 0.5 wt %, or 0.3 wt %.

Fillers disclosed herein may have a BET surface area of greater than about 1 $m^2/g$, greater than about 2 $m^2/g$, or greater than about 3 $m^2/g$. In some embodiments, fillers may have a BET surface area in a range of about 1 $m^2/g$ to about 5 $m^2/g$, or about 2 $m^2/g$ to about 4 $m^2/g$. Surface area analysis may be performed by any suitable technique, including by Quantachrome MONOSORB™ surface analyzer. In particular embodiments, filler particles may have a d50 particle size in a range of about 2 μm to about 20 μm and a BET surface area of greater than about 1 $m^2/g$. Fillers disclosed herein may have a specific gravity in a range of about 2.3 $g/cm^3$ to about 2.5 $g/cm^3$, and a bulk density in a range of about 0.4 $g/cm^3$ to about 0.95 $g/cm^3$.

In some embodiments, surface texture and thermoformability can be controlled by tuning the molecular structure of the polymer matrix by adjusting the molecular weight of the constituent polymer chains of the matrix and/or controlling the concentration of crosslinking and coupling agents to tune the density of the intra- and inter-strand crosslinks. By adjusting the molecular structure of the acrylic matrix, the overall rigidity of the material is decreased to enhance thermoformability, while also balancing with durability and chemical resistance of the solid surface.

For crosslinked solid surfaces produced after processing thermoformable compositions, the molecular weight of the polymer matrix and degree of crosslinking is characterized according to the thermoformability parameter (Q value) that is used to describe the swelling ratio of the cross-linked acrylic. The Q value is described according to Eq. 1:

$$Q \text{ value} = (Wt + We/Ds) + 0.1 Wo/Do \quad (1)$$

where the Q value is the swelling ratio, $Wt$ is the weight of the swollen polymer at equilibrium, $We$ is the weight of the extracted materials, $Ds$ is the density of the solvent (methylene chloride=1.336), $Wo$ is the weight of the original sample, and $Do$ is the density of the polymer (acrylic=1.2). In general, a decreasing Q value indicates increased crosslink density. Thermoformable compositions disclosed herein can form articles having a Q value ranging from 5 to 25 following thermoforming in some embodiments.

Thermoformable compositions can include one or more coupling agents that increase dispersion of the filler and the polymer matrix. In some embodiments, thermoformable compositions can include one or more coupling agents at a percent by weight (wt %) within a range of 0.05 wt % to 1.0 wt %, 0.05 wt % to 0.75 wt %, or 0.10 wt % to 0.50 wt %.

Suitable coupling agents can include 3-methacryloxypropyltrimethoxysilane, 2-hydroxyethylmethacrylate, 8-methacryloxyoctyltrimethoxysilane, and reactive polymeric coupling agents such as BYK-C 8002 and polypropylene glycol phosphate ester Sipomer PAM200.

Thermoformable compositions can also include crosslinking agents having two or more vinyl groups capable of forming intra- and inter-molecular crosslinks within the acrylic matrix during processing and/or thermoforming. Suitable crosslinking agents include ethylene glycol dimethacrylate, polyethylene glycol dimethacrylates such as PEG200 and PEG600 dimethacrylate, trimethylolpropane-tris-methacrylate (TRIM), triallyl isocyanurate (TAIC), triallyl cyanurate (TAC), and the like. In some embodiments, thermoformable compositions can include one or more crosslinking agents at a percent by weight (wt %) within a range of 0.05 wt % to 1.5 wt %, 0.05 wt % to 1.5 wt %, or 0.05 wt % to 1.5 wt %.

Thermoformable compositions can also include a number of functional additives to initiate and control various properties of the thermoforming reaction including initiators, chain transfer agents, wetting/dispersing agents, anti-flocculating agents, pigments, release agents, air release agents, suspension agents, and the like.

Formulation guidelines for the production of thermoformable compositions disclosed herein are provided in Table 1

TABLE 1

| Thermoformable composition formulation guidelines | | |
|---|---|---|
| Class | Compound | Amount |
| Pre-Polymer | Acrylic pre-polymerized syrup at 20% solid | 35-95 wt % |

TABLE 1-continued

Thermoformable composition formulation guidelines

| Class | Compound | Amount |
|---|---|---|
| Copolymer or comonomer | MMA - methyl methacrylate | 0-10 wt % |
| Wetting/dispersing agent | BYK1142 | 0.0-1 wt % |
| Filler | aluminum trihydrate (ATH) - d50 3 µm | 5-65 wt % |
| Coupling agent | 3-methacryloxypropyl trimethoxy silane | 0.0-1.0 wt % |
| Anti-flocculating agent | Triisooctyl phosphate | 0.1-0.8 wt % |
| Pigment | — | 0.5-4.0 wt % |
| Chain transfer agent | N-dodecyl mercaptan | 0.2-2.0 wt % |
| Release agent | Zelec UN-Phosphate ester | 0.05-0.1 wt % |
| Crosslinking agent | Ethylene glycol dimethacrylate | 0.1-1.0 wt % |
| Initiator 1 | t-butyl peroxypivalate | 0.01-0.4 wt % |
| Initiator 2 | t-butyl peroxyneodecanoate | 0.0-0.4 wt % |
| Initiator 3 | t-amyl peroxy-2-ethyl-hexanoate | 0.01-0.2 wt % |
| Suspension Agent | Silica (fumed and/or precipitated) | 0.1-5.0 wt % |
| Air Release Agent | BYK 555 | 0.0-1.0 wt % |

Thermoformable compositions can be processed into textured solid surfaces or articles by combining the components in Table 1 and thermoforming by any suitable continuous or batch technique, including continuous casting, cell casting, extrusion, or other suitable method. Following combination, the thermoformable composition optionally may be degassed under vacuum. The de-gassed thermoformable composition is then processed by the selected method, such as poured into a cell or poured into a continuous casting machine. In some embodiments, the thermoformable composition is heated to 185° F. for a suitable period of time, such as 20 minutes to initiate polymerization. The thermoformable composition is then transferred to a cell and heated in a forced air oven at 240° F. for 12 minutes. If cast against a highly polished surface, once cool, the final article can have a high gloss finish. In some embodiments, surfaces and articles may be thermoformed against a mold, where the included filler provides surface texture as the article is stretched and thinned.

Exemplary ranges for thermoformed surfaces or articles prepared in accordance with the present disclosure are provided in Table 2.

TABLE 2

Physical Properties of Thermoformed Surfaces or Articles

| Property | Ranges | Test method |
|---|---|---|
| Density (g/cm$^3$) | 1.2-1.4 | ASTM D 792 |
| Water Absorption (%) | 0.17-0.21 | ASTM D 570 |
| Tensile Strength (psi) | 7,0000-8,000 | ASTM D 638 |
| Tensile Modulus (psi) | 564,000-624,000 | ASTM D 638 |
| Tensile Elongation (%) | 1.4-1.8 | ASTM D 638 |
| Flexural Strength (psi) | 12,000-14,000 | ASTM D 790 |
| Flexural Modulus (psi) | 433,000-633,00 | ASTM D 790 |
| Barcol Hardness | 43-63 | ASTM D 2583 |
| Rockwell Hardness (M Scale) | 89-109 | ASTM D 785 |
| Charpy Impact (ft-lbs/in.) | 1.6-2.4 | ASTM D 6110 |
| Ball Impact (Supported, ½ lb. ball, no failure) | >150 | NEMA LD3-3.8 |
| Ball Impact (Unsupported, ½ lb. ball, no failure) | >30 | NEMA LD3-3.8 |
| Deflection Temperature Under Load @ 264 psi (° F.) | 180-200 | ASTM D 648 |
| Coefficient of Thermal Expansion (in/in/° F.) | $3.0 \times 10^{-5}$-$3.5 \times 10^{-5}$ | ASTM D 696 |

Thermoformable compositions disclosed herein can be processed for form textured surfaces or articles for a number of commercial and residential applications, including surfaces for wet areas such as sinks, bathtubs, shower pans, and the like; construction surfaces; and various architectural components. While compositions disclosed herein are described in terms of use and function in thermoforming applications, different molding processes can be applied to produce thermoformed slabs or articles, including processes selected from extrusion molding, coextrusion molding, extrusion coating, injection molding, injection blow molding, injection stretch blow molding, thermoforming, cast film extrusion, blown film extrusion, foaming, extrusion blow-molding, injection stretched blow-molding, rotomolding, pultrusion, calendering, additive manufacturing, lamination, and the like.

In general, stretching or drawn down of sheets made from a thermoformable compositions during thermoforming can change surface character and alter gloss values, producing a matte appearance. For example, in an article such as a hot tub, gloss values may be higher on the deck area where the material is minimally drawn, than when compared to the sides and bottom of the tub that are drawn down to a greater extent. Consumers may prefer a uniform appearance and additional processing may be applied to the article to increase matte appearance, such as sanding, media blasting, embossing a pattern on the sheet, cell casting between plates, casting on a matte film, acid-etching, and the like. For example, sanding the sheet with a 320-grit sandpaper may produce a uniform matte appearance on a thermoformed article.

Surface gloss of articles made from thermoformable compositions disclosed herein may be quantified by any suitable method known in the art, such as measurement by BYK-Gardner gloss meter at 60° measurement angle. In some embodiments, thermoformable compositions may be processed into an article or surface having a gloss value at a 60° measurement angle of less than about 20 Gloss Units, less than about 15 Gloss Units, or about less than 10 Gloss Units.

In addition to appearance, texturing of articles made from thermoformable compositions disclosed herein may be modified such that the tactile properties are within desired specifications. Surfaces produced by thermoformable compositions may be quantified using roughness Ra, which is defined as the arithmetic average height of roughness irregularities measured from a mean line within an evaluation length. Roughness Ra may be measured by commercially available instruments such as a Mahr Pocket Surf IV portable surface roughness gage. In some embodiments, thermoformable compositions may be processed into an article or surface having a roughness Ra of less than about 100 microinches, less than about 50 microinches, or less than about 30 microinches.

Articles made from thermoformable compositions disclosed herein may have gloss and roughness measurements within any of the above cited values. In particular embodiments, thermoformable compositions disclosed herein may have a gloss measurement at a 60° measurement angle within a range of about 0 Gloss Units to about 20 Gloss Units, and a roughness Ra within a range of about 1 microinch to about 100 microinches.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

Whenever a numerical range with a lower limit and an upper limit is disclosed, any number and any included range falling within the range is specifically disclosed, including the lower limit and upper limit. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to one having ordinary skill in the art and having the benefit of the teachings herein. Furthermore, no limitations are intended to the details of construction or design herein shown, other than as described in the claims below.

It is therefore evident that the particular illustrative embodiments disclosed above may be altered, combined, or modified and all such variations are considered within the scope and spirit of the present disclosure. The embodiments illustratively disclosed herein suitably may be practiced in the absence of any element that is not specifically disclosed herein and/or any optional element disclosed herein.

The invention claimed is:

1. An article formed from a thermoformable composition, the thermoformable composition comprising:
   a) about 35 wt % to about 95 wt % of an acrylic pre-polymerized syrup;
   b) about 0 wt % to about 10 wt % of a comonomer; and
   c) about 5 wt % to about 65 wt % of a filler having an average particle size (d50) in a range of about 0.1 μm to about 50 μm, wherein the filler comprises one or more selected from a group consisting of aluminum trihydrate, aluminum monohydrate, magnesium hydroxide, calcium carbonate, magnesium silicate, talc, silica, calcium carbonate, calcium metasilicate, Wollastonite, Dolomite, Perlite, hollow glass spheres, and kaolin;
   wherein the article has a surface having a gloss measurement at a 60° measurement angle within a range of about 0 Gloss Units to about 20 Gloss Units, and a roughness Ra within a range of about 1 microinch to about 100 microinches.

2. The article of claim 1, wherein a ratio of filler to acrylic pre-polymerized syrup is in a range of about 0.05 to about 1.9.

3. The article of claim 1, wherein the filler has a d50 particle size in a range of about 2 μm to about 20 μm and a Brunauer-Emmett-Teller (BET) surface area of greater than about 1 $m^2/g$.

4. The article of claim 1, wherein the filler has a Brunauer-Emmett-Teller (BET) surface area of greater than about 3 $m^2/g$.

5. The article of claim 1, wherein the acrylic pre-polymerized syrup has a percent by weight of solids (wt %) ranging from 5 wt % to 40 wt %.

6. The article of claim 1, wherein the comonomer is butyl acrylate.

7. The article of claim 1, wherein the article has a Q value ranging from 5 to 25.

8. The article of claim 1, wherein the thermoformable composition comprises:
   a) about 35 wt % to about 95 wt % of an acrylic pre-polymerized syrup;
   b) about 0 wt % to about 10 wt % of a comonomer;
   c) about 5 wt % to about 65 wt % of a filler, wherein the filler has an average particle size (d50) in a range of 0.1 μm to 50 μm;
   d) about 0.0 wt % to about 1.0 wt % of a coupling agent; and
   e) about 0.1 to about 1.0 wt % of a crosslinking agent.

9. The article of claim 1, wherein the filler comprises less than about 1.0 wt % of moisture.

10. The article of claim 1, wherein the thermoformable composition further comprises one or more selected from a group consisting of wetting/dispersing agent, anti-flocculating agent, pigment, release agent, air release agent, suspension agent, and initiator.

11. The article of claim 1, wherein the article has a density of greater than about 1.3 $g/cm^3$.

12. A method for producing a thermoformed article comprising the steps of:

i) preparing a thermoformable composition comprising:
   a) about 35 wt % to about 95 wt % of an acrylic pre-polymerized syrup;
   b) about 0-10 wt % of a comonomer; and
   c) about 5-65 wt % of a filler, wherein the filler has an average particle size (d50) in a range of 0.1 μm to 50 μm, and wherein the filler comprises one or more selected from a group consisting of aluminum trihydrate, aluminum monohydrate, magnesium hydroxide, calcium carbonate, magnesium silicate, talc, silica, calcium carbonate, calcium metasilicate, Wollastonite, Dolomite, Perlite, hollow glass spheres, and kaolin;
ii) casting the thermoformable composition into a sheet; and
iii) thermoforming the cast sheet against a mold to produce a thermoformed article, wherein the article has a surface having a gloss measurement at a 60° measurement angle within a range of about 0 Gloss Units to about 20 Gloss Units, and a roughness Ra within a range of about 1 microinch to about 100 microinches.

13. The method of claim 12, further comprising modifying the surface of the thermoformed article by one or more of sanding, media blasting, embossing a pattern on the article, cell casting between plates, casting on a matte film, and acid-etching.

14. The method of claim 12, wherein a ratio of filler to acrylic pre-polymerized syrup is in a range of 0.05 to 1.9.

15. The method of claim 12, wherein the acrylic pre-polymerized syrup has a percent by weight of solids (wt %) ranging from 5 wt % to 40 wt %.

16. The method of claim 12, wherein the thermoformed article has a Q value ranging from 5 to 25 following thermoforming.

17. The method of claim 12, wherein the filler has a d50 particle size in a range of about 2 μm to about 20 μm and a BET surface area of greater than about 1 $m^2/g$.

18. The article of claim 1, wherein the thermoformable composition comprises about 0.05 wt % to about 1.0 wt % of a coupling agent.

* * * * *